(12) United States Patent
Borgwardt et al.

(10) Patent No.: US 9,088,156 B2
(45) Date of Patent: Jul. 21, 2015

(54) ELECTRIC SWITCH

(71) Applicant: Siemens Aktiengesellschaft, Munich (DE)

(72) Inventors: Andre Borgwardt, Schoenwalde-Ot Paaren (DE); Thomas Driehorn, Berlin (DE); Peter Kopaczewski, Berlin (DE); Andreas Krauβ, Berlin (DE); Aron-Ernst Musiol, Mahlow (DE); Gerd Müller, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 214 days.

(21) Appl. No.: 13/771,436

(22) Filed: Feb. 20, 2013

(65) Prior Publication Data

US 2013/0215545 A1    Aug. 22, 2013

(30) Foreign Application Priority Data

Feb. 21, 2012   (DE) .......................... 10 2012 202 642

(51) Int. Cl.
| | | |
|---|---|---|
| *H02H 3/00* | (2006.01) | |
| *H02H 3/08* | (2006.01) | |
| *H02H 3/04* | (2006.01) | |

(52) U.S. Cl.
CPC ............... *H02H 3/083* (2013.01); *H02H 3/044* (2013.01)

(58) Field of Classification Search
CPC ............................... H02H 3/083; H02H 3/044
USPC ........................................................... 361/87
See application file for complete search history.

(56) References Cited

U.S. PATENT DOCUMENTS

| | | | | |
|---|---|---|---|---|
| 5,309,312 | A * | 5/1994 | Wilkerson et al. ............... | 361/79 |
| 6,147,847 | A * | 11/2000 | Hochgraef et al. .......... | 361/93.2 |
| 7,474,070 | B2 * | 1/2009 | Miyazawa et al. ............ | 318/432 |
| 2004/0024545 | A1 | 2/2004 | Tian | |

FOREIGN PATENT DOCUMENTS

| | | |
|---|---|---|
| CN | 1477747 A | 2/2004 |
| CN | 101770248 A | 7/2010 |

(Continued)

OTHER PUBLICATIONS

German Office Action. DE 10 2012 202 642.8.

(Continued)

*Primary Examiner* — Thienvu Tran
*Assistant Examiner* — Ann Hoang
(74) *Attorney, Agent, or Firm* — Harness, Dickey & Pierce, P.L.C.

(57) ABSTRACT

An electric switch is disclosed, in particular an electric circuit breaker. In at least one example embodiment, the switch includes a measuring channel for measuring an electric measured variable and is switched off when the result of a measurement reaches or exceeds a limit value. To test the mode of operation of the measuring channel, the electric measured variable is switched to a reference channel and a reference signal source is switched to the measuring channel and the reference result obtained via the measuring channel is compared with a reference setpoint. The switch is also tripped if, to test the mode of operation of the measuring channel, the electric measured variable is switched to the reference channel and the result obtained via the reference channel reaches or exceeds the limit value.

7 Claims, 4 Drawing Sheets

(56) References Cited

FOREIGN PATENT DOCUMENTS

| | | |
|---|---|---|
| DE | 3823101 A1 | 1/1990 |
| DE | 69016400 T2 | 6/1995 |
| DE | 19619629 C1 | 10/1997 |
| DE | 102010036209 A1 | 3/2012 |
| DE | 102010036210 A1 | 3/2012 |
| EP | 0440764 A1 | 8/1991 |
| EP | 0570603 A1 | 11/1993 |
| EP | 0785610 A2 | 7/1997 |
| JP | 2000-171515 A | 5/2000 |
| JP | 2002-286777 A | 10/2002 |
| JP | 2003009374 A | 1/2003 |

OTHER PUBLICATIONS

Chinese Office Action dated Jan. 14, 2015 for CN 201310131494.2.

* cited by examiner

ELECTRIC SWITCH

PRIORITY STATEMENT

The present application hereby claims priority under 35 U.S.C. §119 to German patent application number DE 10 2012 202 642.8 filed Feb. 21, 2012, the entire contents of which are hereby incorporated herein by reference.

FIELD

At least one embodiment of the invention generally relates to an electric switch, in particular an electric circuit breaker.

BACKGROUND

It is known that electric switches, in particular electric circuit breakers, can be provided with tripping devices which in the event of overloading, in particular in the event of an excessive current, initiate the tripping of the switch.

SUMMARY

At least one embodiment of the invention specifies an electric switch which facilitates the particularly reliable acquisition of electric measured variables, in particular with a view to the correct tripping of the switch.

Advantageous embodiments of the switch according to the invention are disclosed in subclaims.

It is provided according to at least one embodiment of the invention that the switch is equipped with a multi-channel measuring device comprising a measuring channel for measuring an electric measured variable, that the switch comprises a tripping device connected to the measuring device, which initiates the tripping of the switch when the result of a measurement by the measuring device reaches or exceeds a prespecified limit value, that the switch comprises at least one reference channel and one reference signal source, wherein the reference signal source can optionally be connected to the at least one measuring channel, that a testing device is connected to the measuring device, wherein, to test the mode of operation of the measuring channel, the electric measured variable is switched to the reference channel and the reference signal source is switched to the at least one measuring channel and the reference result obtained via the reference channel is compared with a prespecified reference setpoint, wherein the tripping device is embodied such that it also initiates the tripping of the switch when, to test the mode of operation of the measuring channel, the electric measured variable is switched to the reference channel and the result obtained via the reference channel reaches or exceeds the prespecified limit value.

At least one embodiment of the invention also relates to a method for operating an electric switch comprising a multi-channel measuring device for measuring an electric measured variable in which the switch comprises a tripping device connected to the measuring device and the tripping of the switch is initiated when the result of a measurement by the measuring device reaches or exceeds a prespecified limit value. According to at least one embodiment of the invention, it is provided with respect to a method of this kind that the switch comprises at least one reference channel and one reference signal source, that a testing device is connected to the measuring device, wherein the mode of operation of the measuring channel is tested in that the electric measured variable is switched to the reference channel and the reference signal source to the at least one measuring channel and the result of a measurement obtained via the measuring channel is compared with a prespecified reference setpoint, wherein the switch is also tripped by the tripping device when the result of a measurement obtained via the reference channel reaches or exceeds the prespecified limit value.

BRIEF DESCRIPTION OF THE DRAWINGS

The invention will now be explained in more detail with reference to example embodiments; these show by way of example.

For purposes of clarity, the same reference numbers are always used in the figures for identical or comparable components.

DETAILED DESCRIPTION OF THE EXAMPLE EMBODIMENTS

Figure 1:
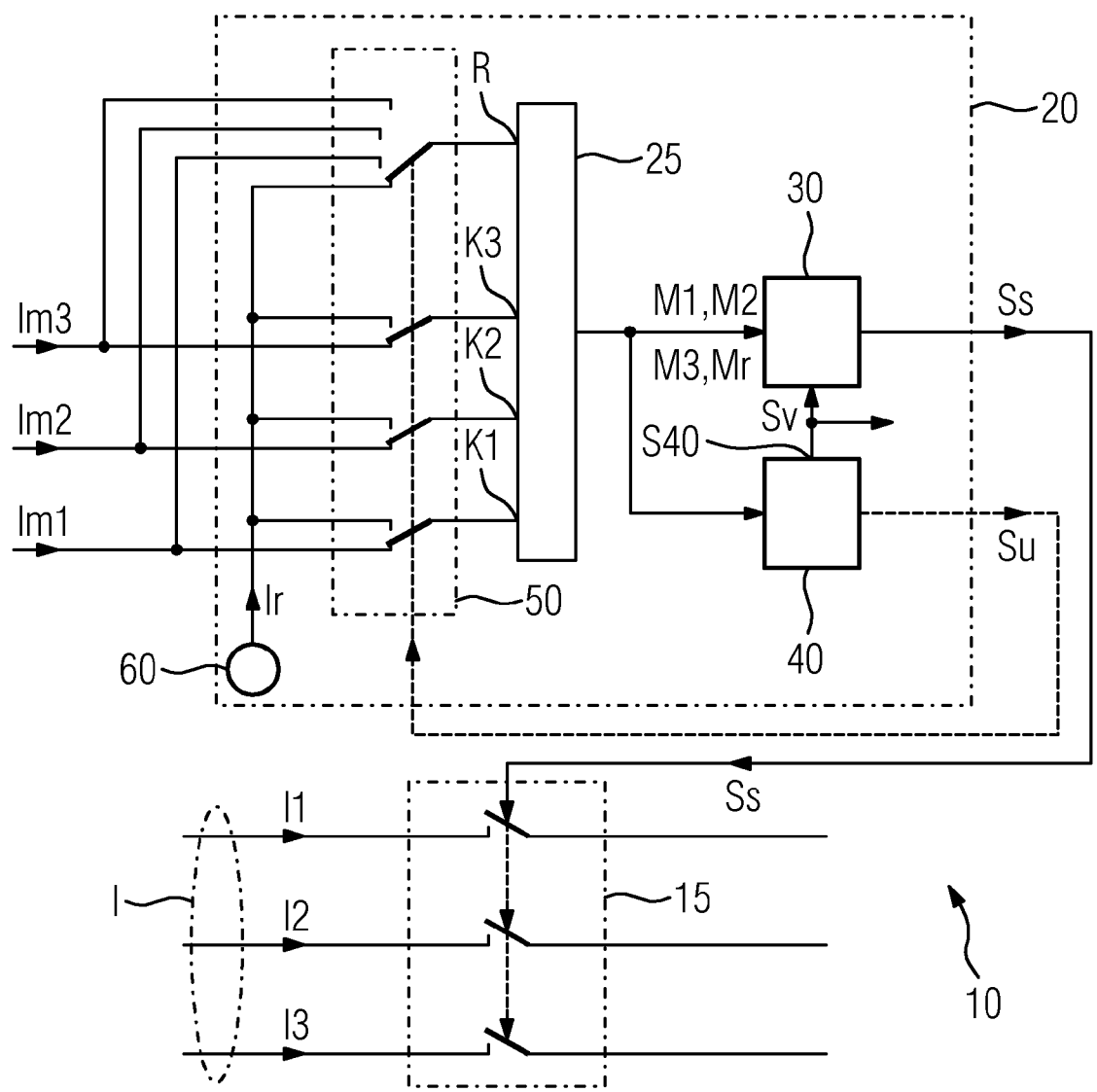
FIG. 1 shows an example embodiment of a three-phase circuit breaker according to the invention which is equipped with a measuring device, a testing device and a tripping device.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

It is provided according to at least one embodiment of the invention that the switch is equipped with a multi-channel measuring device comprising a measuring channel for measuring an electric measured variable, that the switch comprises a tripping device connected to the measuring device, which initiates the tripping of the switch when the result of a measurement by the measuring device reaches or exceeds a prespecified limit value, that the switch comprises at least one reference channel and one reference signal source, wherein the reference signal source can optionally be connected to the at least one measuring channel, that a testing device is connected to the measuring device, wherein, to test the mode of operation of the measuring channel, the electric measured variable is switched to the reference channel and the reference signal source is switched to the at least one measuring channel and the reference result obtained via the reference channel is compared with a prespecified reference setpoint, wherein the tripping device is embodied such that it also initiates the tripping of the switch when, to test the mode of operation of the measuring channel, the electric measured variable is switched to the reference channel and the result obtained via the reference channel reaches or exceeds the prespecified limit value.

A substantial advantage of the switch according to at least one embodiment of the invention can be seen in the fact that, due to the multi-channel design of the measuring device, the switch facilitates the testing of the measuring channels, for example even during the operation of the switch. As a result of this testing option, the electric switch according to the invention ensures more reliable and safer operation than previous switches which do not offer a testing option of this kind.

In order to ensure reliable tripping of the switch in the event of an overload situation, it is seen to be advantageous for the switch to comprise a tripping device connected to the measuring device, which initiates the tripping of the switch when the result of a measurement by the measuring device reaches or exceeds a prespecified limit value.

Particularly simply and hence advantageously, it is possible to achieve a test of the measuring device if the tripping device is embodied such that it also initiates the tripping of the switch when, to test the mode of operation of the measuring channel of the measuring device, the electric measured variable is switched to the reference channel and the reference result obtained via the reference channel reaches or exceeds the prespecified limit value.

A test can be performed particularly quickly and simply with the aid of the reference signal source if the testing device is suitable, to test the mode of operation of the measuring channel of the measuring device, to connect the reference signal source to the measuring channel, to compare the result of a measurement obtained via the measuring channel with a prespecified reference setpoint and to generate a comparison signal indicating the result of the comparison.

It is also possible to test the measuring device, to connect the reference signal source to the measuring channel and the reference channel, to compare the result of a measurement obtained via the measuring channel with the reference result obtained via the reference channel and to generate a comparison signal indicating the result of the comparison.

The electric switch can, for example, be a low-voltage circuit breaker.

At least one embodiment of the invention also relates to a method for operating an electric switch comprising a multi-channel measuring device for measuring an electric measured variable in which the switch comprises a tripping device connected to the measuring device and the tripping of the switch is initiated when the result of a measurement by the measuring device reaches or exceeds a prespecified limit value. According to at least one embodiment of the invention, it is provided with respect to a method of this kind that the switch comprises at least one reference channel and one reference signal source, that a testing device is connected to the measuring device, wherein the mode of operation of the measuring channel is tested in that the electric measured variable is switched to the reference channel and the reference signal source to the at least one measuring channel and the result of a measurement obtained via the measuring channel is compared with a prespecified reference setpoint, wherein the switch is also tripped by the tripping device when the result of a measurement obtained via the reference channel reaches or exceeds the prespecified limit value.

With respect to the advantages of the method according to at least one embodiment of the invention, reference is made to the above statement in relation to the switch according to at least one embodiment of the invention, since the advantages of the method according to at least one embodiment of the invention substantially correspond to those of the switch according to at least one embodiment of the invention.

It is considered to be particularly advantageous if a tripping signal is generated when the result of a measurement by the measuring device exceeds or falls below a prespecified limit value or when, to test the mode of operation of the measuring channel of the measuring device, the electric measured variable is switched to the reference channel and the reference result obtained via the reference channel exceeds or falls below the prespecified limit value.

FIG. 1 shows a three-phase low-voltage circuit breaker 10, equipped with a three-phase circuit-breaking element 15. The three-phase circuit-breaking element 15 is suitable for switching a three-phase current I, the phase currents of which are identified by the reference characters I1, I2 and I3 in FIG. 1. To switch the three phase currents I1, I2 and I3, the three-phase circuit-breaking element 15 comprises three switches which can be turned on and off via a tripping signal Ss.

The three-phase low-power switch 10 is equipped with a protective device 20 including a multi-channel measuring device 25, a tripping device 30, a testing device 40, a changeover device 50 and a reference signal source 60.

The multi-channel measuring device 25 including a plurality of measuring channels of which in FIG. 1 three measuring channels are designated with the reference characters K1, K2 and K3. Three measured variables Im1, Im2 and Im3 which indicate the size of the phase currents I1, I2 and I3 and are, for example, proportional thereto, are applied to the three measuring channels K1, K2 and K3 via the changeover device 50. The three measured variables Im1, Im2 and Im3 pass via the measuring channels K1, K2 and K3 into the multi-channel measuring device 25, which measures the measured variables and generates measuring results in the form of measured values M1, M2 and M3. The measuring results or measured values M1, M2 and M3 go to both the tripping device 30 and the testing device 40.

The multi-channel measuring device 25 is also equipped with a reference channel R. One of the three measured variables Im1, Im2 or Im3 or a reference signal Ir from the reference signal source 60 can optionally be applied to the reference channel R via the changeover device 50. In normal operation, as shown by way of example in FIG. 1, the measured variables Im1, Im2 and Im3 are applied to the three measuring channels K1, K2 and K3 so that the measured values M1, M2 and M3 are applied to the tripping device 30. The tripping device 30 will compare the measured values M1, M2 and M3 with a prespecified limit value and generate a tripping signal Ss to trip the three-phase circuit-breaking element 15 when at least one of the three measured values M1, M2 or M3 exceeds the prespecified limit value.

The function of the testing device 40 consists in checking the correct mode of operation of the multi-channel measuring device 25. To this end, the testing device 40 preferably provides three different test modes, which are explained in the following by way of example. In this context, the further explanations relate to a test of the measuring channel K1 of the multi-channel measuring device 25. Obviously, the two other measuring channels K2 and K3 can be tested in the same way.

Figure 2:
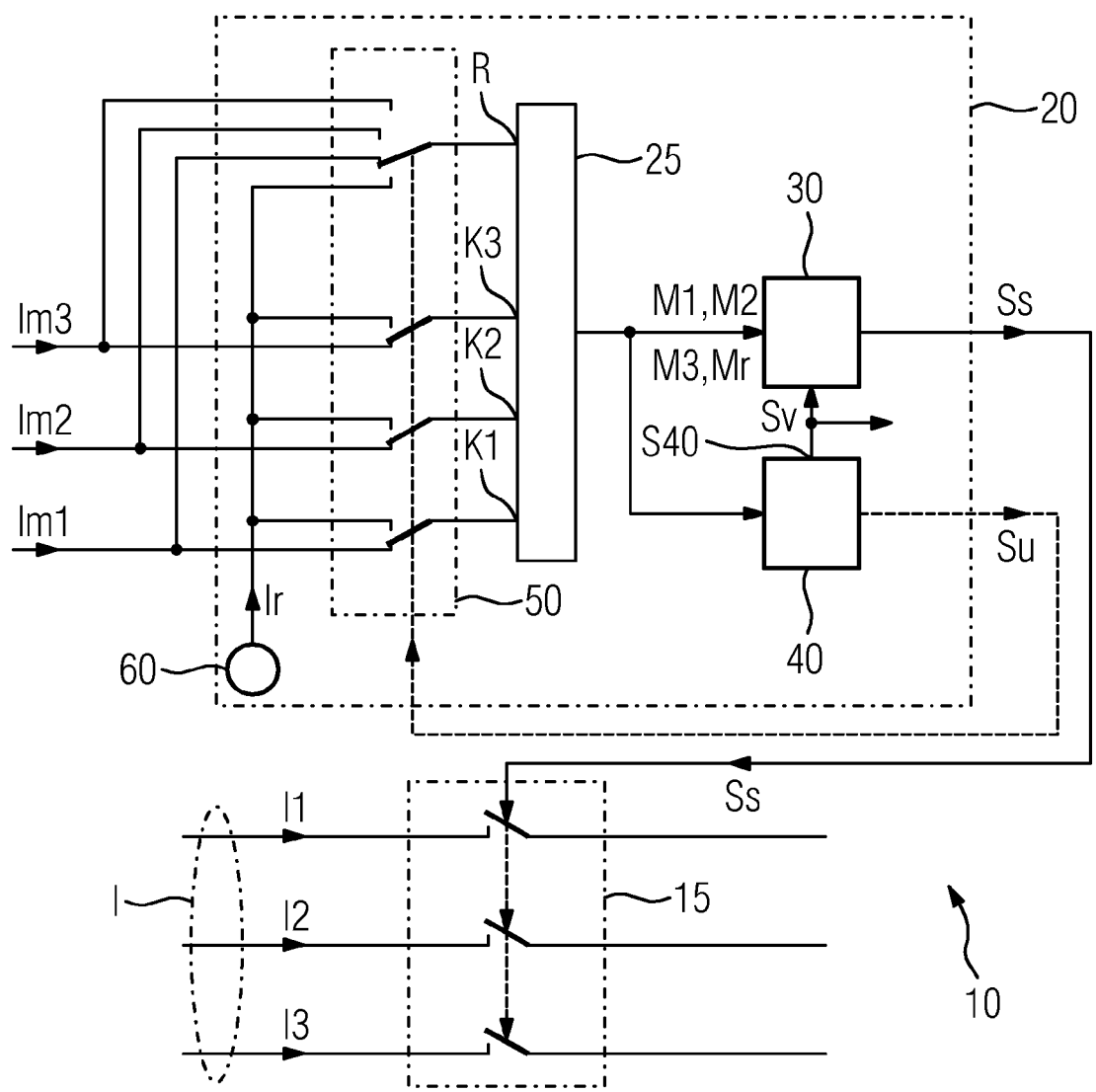
FIG. 2 shows a first test mode, which can be performed by the testing device of the switch shown in FIG. 1.

1. Testing the Measuring Channel K1 with the Aid of the Reference Channel R:

FIG. 2 shows by way of example how the correct mode of operation of the measuring channel K1 can be checked by the testing device 40 with the aid of the reference channel R. To this end, the changeover device 50 connects the reference channel R to the measuring channel K1 and hence the same measured variable Im1 is applied to the reference channel R as to the measuring channel K1. The multi-channel measuring device 25 hence generates two measuring results or measured values M1 and Mr each of which relate to the same measured variable Im1. Hence, the testing device 40 has the opportunity of checking that the measuring channel K1 is functioning correctly in that it compares the measured value M1 of the measuring channel K1 with the reference value Mr of the reference channel R.

If the difference between the measured value M1 of the measuring channel K1 and the reference value Mr of the reference channel R falls below a prespecified threshold value Dmax, the testing device 40 assumes that the measuring channel K1 is working correctly. The testing device 40 can, for example, signal correct functioning by a comparison signal Sv with a logic "0" which it issues at a signal output S40.

If, on the other hand, the testing device 40 establishes that the discrepancy between the measured value M1 of the measuring channel K1 and the reference value Mr of the reference channel R exceeds the prespecified threshold value Dmax, it can signal this discrepancy, for example, by a comparison signal Sv with a logic "1".

Therefore, the signaling takes place as follows:

$$|Mr-M1|<D\max \Rightarrow Sv=0$$

$$|Mr-M1|\geq D\max \Rightarrow Sv=1$$

Hence, a malfunction of the measuring channel K1 is indicated by the comparison signal Sv.

The comparison signal Sv can, for example, be displayed on a display device of the switch and/or forwarded to a central control center. The testing device 40 can also forward the comparison signal Sv to the tripping device 30, for example, and, in the event of a malfunction of the measuring channel K1, prompt the tripping device 30 to generate a tripping signal Ss which switches off the three-phase circuit-breaking element 15.

Figure 3:
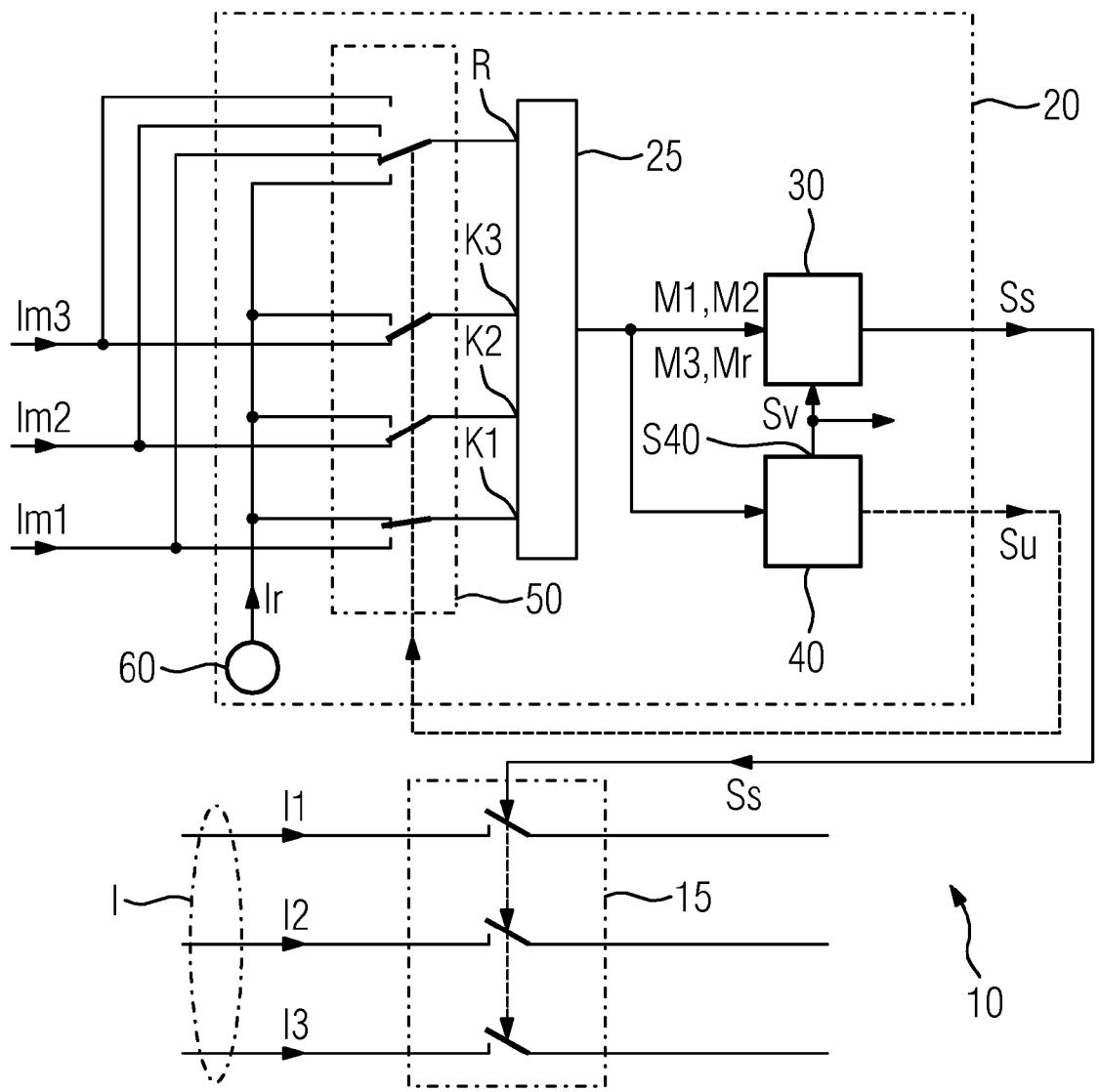
FIG. 3 shows by way of example, a second test mode, which can be performed by the testing device of the switch shown in FIG. 1

2. Testing the Measuring Channel K1 with the Aid of the Reference Signal Source 60:

FIG. 3 shows by way of example how the reference signal source 60 can be used to test the measuring channel K1. To this end, the testing device 40 generates a changeover signal Su with which it sets the changeover device 50 such that the reference signal Ir of the reference signal source 60 is switched to the measuring channel K1 and the measured variable Im1 instead of to the reference channel R the multi-channel measuring device 25. Following the changeover of the changeover device 50, the multi-channel measuring device 25 generates a measured value M1, which describes the size of the reference signal Ir of the reference signal source 60 and a reference value Mr, which describes the size of the measured variable Im1.

In the context of the evaluation of the measuring results, the testing device 40 will check whether the measured value M1 supplied via the measuring channel K1 conforms at least approximately to a prespecified reference setpoint Rsoll for the reference signal source 60.

If the discrepancy between the prespecified reference setpoint Rsoll and the measured value M1 falls below the prespecified threshold value Dmax, the testing device 40 assumes that the measuring channel K1 is functioning correctly and generates a comparison signal Sv with a logic "0".

If, on the other hand, the testing device 40 establishes that the discrepancy between the measured value M1 of the measuring channel K1 and the prespecified reference setpoint Rsoll reaches or exceeds the prespecified threshold value Dmax, it generates a comparison signal Sv with a logic "1", which indicates a fault in the measuring channel K1.

Therefore, the signaling takes place, for example, as follows:

$$|Rsoll-M1|<Dmax \Rightarrow Sv=0$$

$$|Rsoll-M1|\geq Dmax \Rightarrow Sv=1$$

As already mentioned, the comparison signal Sv can be displayed on a display device of the switch, forwarded to a central control center and/or used, with the aid of the tripping device 30, to generate a tripping signal Ss to switch off the three-phase circuit-breaking element 15.

The tripping device 30 is preferably embodied such that, during the test phase, in which the measured variable Im1 is switched to the reference channel R, it monitors the measured value Mr of the reference channel R and switches off the three-phase circuit-breaking element 15 when the measured value Mr of the reference channel reaches or exceeds the prespecified limit value.

Figure 4:
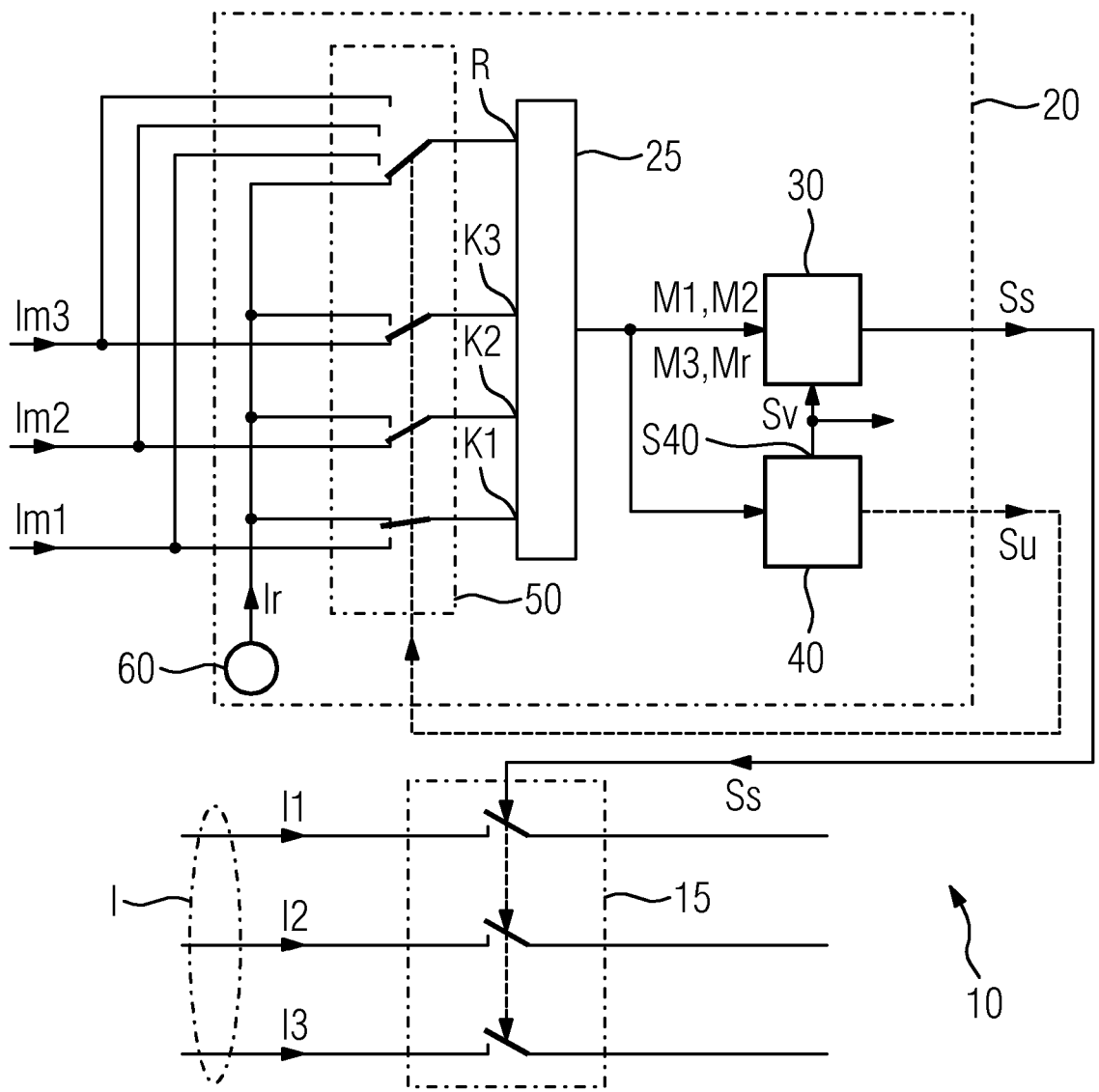
FIG. 4 shows by way of example, a third test mode, which can be performed by the testing device of the switch shown in FIG. 1.

3. Testing the Measuring Channel K1 and the Reference Channel R with the Aid of the Reference Signal Ir of the Reference Signal Source 60:

The measuring channel K1 and the reference channel R of the multi-channel measuring device 25 can also be tested as follows: with the aid of the changeover signal Su, the testing device 40 switches on the changeover device 50, for example, such that the reference signal Ir of the reference signal source 60 is applied to both the measuring channel K1 and the reference channel R (see FIG. 4). A circuit of this kind causes the multi-channel measuring device 25 to generate a measured value M1 and a reference value Mr, which must be approximately the same size and in case correspond to the prespecified reference setpoint Rsoll for the reference signal source 60.

If the testing device 40 establishes that the discrepancy between the measured reference value Mr of the reference channel R and the measured value M1 of the measuring channel K1 lies below the prespecified threshold value Dmax and both measured values correspond at least approximately to the reference setpoint Rsoll, it assumes that the multi-channel measuring device 25 is functioning correctly and generates, for example, a comparison signal Sv with a logic "0".

If, on the other hand, the testing device 40 establishes that the measured reference value Mr of the reference channel R deviates too greatly from the measured value M1 of the measuring channel K1 or from the prespecified reference setpoint Rsoll, it assumes that there is a malfunction of the multi-channel measuring device 25 and generates a comparison signal Sv with a logic "1", which indicates a fault in the measuring device 25.

Therefore, the signaling takes place, for example, as follows:

$$|Rsoll-M1|<Dmax \text{ and } |Mr-M1|<Dmax \Rightarrow Sv=0$$

$$|Rsoll-M1|\geq Dmax \text{ or } |Mr-M1|\geq Dmax \Rightarrow Sv=1$$

The comparison signal Sv can be displayed by a display device of the three-phase low-voltage circuit breaker 10, forwarded to a higher-ranking control center and/or used, with the aid of the tripping device 30, to generate a tripping signal Ss with which the three-phase circuit-breaking element 15 and hence the three-phase current is switched off by the low-voltage circuit breaker 10.

In order to ensure, during the testing of the measuring channel K1, that the measured variable Im1 will nevertheless continue to be acquired and evaluated, this is preferably switched to a fourth measuring channel of the multi-channel measuring device 25 (which, for purposes of clarity, is not shown in any more detail in FIG. 1) and monitored via this measuring channel.

In the above example embodiments, it is assumed by way of example that the tripping signal Ss always switches the three-phase circuit-breaking element 15 off completely so that all phase currents I1, I2 and I3 are switched off. Alternatively, it is possible also to control and trip the circuit-breaking element 15 individually for each phase so that in each case only those phase currents I1, I2 or I3 which can no longer be correctly measured with the aid of the multi-channel measuring device 25 are switched off.

Although the invention has been illustrated and described in detail by means of preferred exemplary embodiments, the invention is not restricted by the disclosed examples and other variations can be derived therefrom by the person skilled in the art without departing from the scope of protection of the invention.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric switch, comprising:
   a multi-channel measuring device including a measuring channel configured to measure an electric measured variable;
   a tripping device, connected to the measuring device, configured to initiate tripping of the switch when a result of a measurement of the measuring device reaches or exceeds a limit value;
   a reference channel; and
   a reference signal source,
   wherein to test a mode of operation of the measuring channel upon a testing device being connected to the measuring device, the electric measured variable is switched to the reference channel and the reference signal source is switched to the measuring channel,
   wherein the result of the measurement obtained via the measuring channel is compared with a reference setpoint, and
   wherein the tripping device also initiates the tripping of the switch upon the result of a measurement, obtained via the reference channel, reaching or exceeding the limit value.

2. The switch of claim 1, wherein the testing device is configured to generate a comparison signal showing the result of the comparison, which signals a fault in the measuring device.

3. The switch of claim 2, wherein, the switch is a low-voltage circuit breaker.

4. The switch of claim 1, wherein, the switch is a low-voltage circuit breaker.

5. The switch of claim 1, wherein the electric switch is an electric circuit breaker.

6. A method for operating an electric switch including a multi-channel measuring device for measuring an electric measured variable, the switch including a tripping device connected to the measuring device and the tripping of the switch being initiated when a result of a measurement of the measuring device reaches or exceeds a limit value, the switch further including a reference channel and a reference signal source, the method comprising:
   testing a mode of operation of a measuring channel, upon a testing device being connected to the measuring device, by switching the electric measured variable to the reference channel and the reference signal source to the measuring channel; and
   comparing the result of a measurement obtained via the measuring channel with a reference setpoint, wherein the switch is tripped by the tripping device upon the limit value being reached or exceeded by the result of a measurement obtained via the reference channel.

7. The method of claim 6, wherein a tripping signal is generated
   upon the result of a measurement of the measuring device exceeding or falling below a limit value or
   upon, to test the mode of operation of the measuring channel of the measuring device, the electric measured variable being switched to the reference channel and a reference result obtained via the reference channel exceeding or falling below the limit value.

* * * * *